D. BEEBE.

FAUCET BUNG.

No. 11,552. Reissued June 30, 1896.

WITNESSES: INVENTOR:

C. B. Tilney

Robt Sollberger

Dillon Beebe,

BY Drake & C., ATTY'S.

UNITED STATES PATENT OFFICE.

DILLON BEEBE, OF NEWARK, NEW JERSEY, ASSIGNOR, BY DIRECT AND MESNE ASSIGNMENTS, TO THE NEWARK FAUCET COMPANY, OF NEW JERSEY.

FAUCET-BUNG.

SPECIFICATION forming part of Reissued Letters Patent No. 11,552, dated June 30, 1896.

Original No. 534,708. dated February 26, 1895. Application for reissue filed January 24, 1896. Serial No. 576,745.

*To all whom it may concern:*

Be it known that I, DILLON BEEBE, a citizen of the United States, residing at Newark, in the county of Essex and State of New Jersey, have invented certain new and useful Improvements in Faucet-Bungs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in that class of faucet-bungs represented by the one shown in my prior application, filed February 8, 1894, Serial No. 499,434, the objects of the present improvements being to secure greater impermeability to the valves when subjected to the strain of the compressed fluid, to simplify and reduce the cost of construction as compared to other devices now in use, and to secure other advantages and results, some of which will be referred to hereinafter.

The invention consists in the improved faucet-bung and in the arrangements and combinations of the parts, substantially as will be hereinafter described, and finally embraced in the clauses of the claim.

Figure 1:
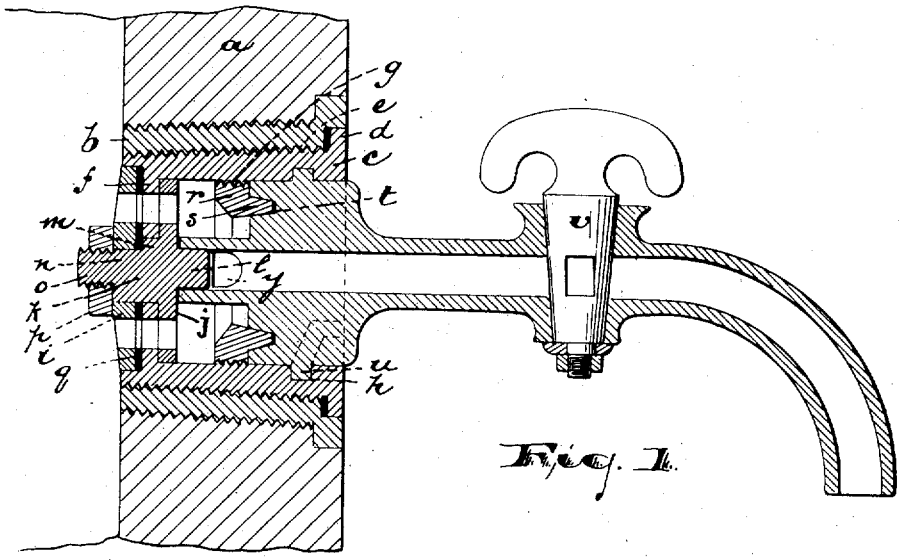
Figure 2:
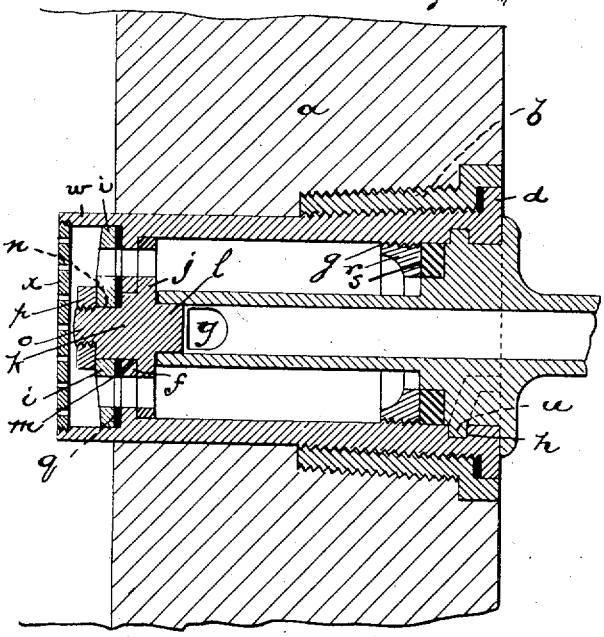
Figure 3:
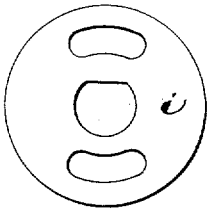
Figure 4:
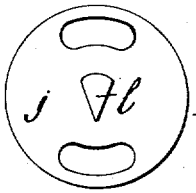
Figure 5:
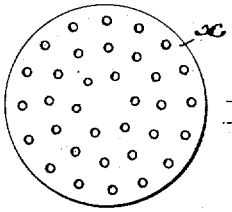

Referring to the accompanying drawings, in which like letters of reference indicate corresponding parts in each of the views, Figure 1 is a central vertical section of the bung and key faucet when in their relative positions, the parts being shown as formed for beer-barrels more particularly. Fig. 2 is a similar view showing the parts formed for ale-barrels. Figs. 3, 4, and 5 are detail plans of an inner valve-disk, an outer valve-disk, and a screen, respectively.

In said drawings, *a* indicates the barrel, and *b* the bushing, adapted to be arranged in the bung-hole thereof, said bushing being interiorly and exteriorly threaded to receive the bung and to be secured in the barrel in the manner ordinary in this class of inventions.

*c* indicates the bung, which is outwardly flanged, as at *d*, and threaded, as at *e*, to engage the bushing. Interiorly, at its inner end, said bung is provided with a perforated valve-seat *f*. Next, toward the center of the interior and distant from the valve-seat, are threads *g*, on which a faucet-seat may be adjustably arranged, and toward the front end of the bung are disposed inclined grooves *h*. The valve-seat is preferably flat on its opposite sides to receive the disk valves *i* and *j*. The said disk valves are perforated in correspondence with the perforation in the valve-seat, and are adapted to be turned simultaneously to open and cut off communication from the interior to the exterior of the barrel, as will be understood. The several perforations in the valve seat and disks are formed at points a greater distance from the axial center of the valve than the outer periphery of the key end of the faucet, the disks being enlarged in diameter to provide such arrangement. The perforations may thus be made more ample in passage capacity to admit a freer flow than if the passages were nearer to the axial center and led the fluid directly into the faucet-passage, as in certain devices hertofore provided.

The round plates or disks *i* and *j*, extending out to the interior walls of the bung-body, so that their peripheries engage said walls, cover the whole seat *f*, and dirt cannot lodge thereon or hard particles of matter become wedged between said peripheries and the said walls and thus interfere with the turning operation or damage the surface of said seat. The passages for the fluid being wholly within the peripheries of the disks, there is no chance for clogging allowed. The disks, furthermore, admit of large and ample passages or perforations being formed, and more ample closed webs or surfaces for imperviously covering the valve-seat perforations.

The bung-chamber outside of the key end of the faucet, when the same is in place, and between the valve-seat and the forward faucet-seat, is also of ample capacity to receive the flow from the several or plurality of large valve-passages and store a limited amount of fluid therein and transmit a steady flow into and through the large opening *y* in the side of the faucet forward of its key end without producing a too sharp change in the direction of flow. By this construction the fluid is given an easy and full flow through the faucet, the openings are capacious and are not easily clogged by solid matter contained in the fluid, and withal, and notwithstanding the distance of the valve-openings from the center, the flow is fully and completely checked by the oppositely-disposed disks bearing on the sides of the valve-seat.

The capacity of the large valve-openings, outside bung-chamber, and passage *y* being substantially equal to or greater than the passage through the faucet, the flow through the latter is rendered full and yet free from bubbles or "splutter."

The interior disk valve *j* is formed integral with a spindle or hub *k*, the said spindle or hub being at its outer end angular, as at *l*, Fig. 4, to receive the key end of the faucet. Back of this end the said hub is provided with the outer disk *i*. Back of this, in turn, said hub provides a bearing *m* to enter the central opening in the valve-seat, the said bearing admitting of a pivotal operation of the valves. Back of this again, as at *n*, the said hub provides a bearing for the inner valve *i*, the said bearings being shaped to prevent independent pivotal movement of the valve. At the inner extremity, as at *o*, the hub is threaded to receive the nut *p*, by means of which the disks are held in close and impervious relation to the valve-seat. The inner valve-disk serves as a washer for the nut, as well as to give increased impermeability to the valve. I prefer to provide the engaging surface of the inner valve-disk with a packing *q*. By employing the inner and outer valve-disks in relation to the one valve-seat, as described, I secure greater engaging surface of valves and valve-seats, so that there is less opportunity for leaking because of imperfect engagement or interference produced by the introduction of extraneous matters tending to hold the surfaces apart. The inner valve *i* takes the strain or pressure of the compressed fluids and relieves the outer valve of the same, so that the said outer valve simply serves, in the event of the inner valve being imperfect, the purpose of preventing the escape of fluid due to leakage. To enable the outer disk valve to be arranged in relation to the seat as described and yet to provide the bung with a seat against which the faucet may bear and produce an impervious joint, I have formed on the interior of the bung, forward of the valve-seat, the threads *g*, before referred to, on which is secured a removable and adjustable faucet-seat ring *r*, which secures with its packing an impermeable joint of faucet and bung, and lies considerably distant from the valve-seat, so as to form a chamber between the faucet-seat and valve, through which the fluid passes to the perforated side of the faucet. Said ring at its inner edge is turned outwardly, as at *s*, in the construction adapted for beer-barrels, so as to enter into close and impervious engagement with a packing-ring arranged in an annular groove *t* in the faucet. Said ring may, however, have a flat bearing-surface, as in Fig. 2, for use in connection with ale-barrels where the axial length of the bung may be considerable; but where, as in the case of beer-barrels, the said axial length must be limited and the space for the several operating parts is contracted, I prefer the construction shown in Fig. 1. Here, it may be observed, the faucet-seat ring *r* is reamed out or dished back of the outwardly-turned edge, and thus an enlarged chamber or passage to the faucet-opening *y* is formed, so that the flow will not be retarded, and as the opening *y* lies within the said chamber or passage when in use the key end of the faucet can be made very short and the axial length of the bung reduced. The several perforations in the valve seat and disks are formed at points a greater distance from the axial center of the valve than the outer periphery of the key end of the faucet, the disks being enlarged in diameter to provide such an arrangement. The perforation may thus be made more ample in passage capacity to admit a freer flow than if the passages were nearer the axial center and led the fluid directly into the faucet-passage, as in certain devices heretofore provided. Outside of said ring *r* the bung is provided with inclined grooves such as have been referred to heretofore in my prior application, and these receive lugs *u* on the faucet, so that when the said lugs are inserted in said grooves, and the faucet is turned, the latter is brought into close engagement with the faucet-seat *s*, so that there can be no escape of fluid through the joint.

The inner or key end of the faucet is provided with an opening or aperture, corresponding more or less closely in shape to the angular end *l* of the valve-hub, so that, when the faucet is inserted into the bung, it is guided into such relation to the end *l* as that when the faucet is turned it also turns the valve, as will be understood.

The faucet is provided with the ordinary spigot *v*, adapted to turn off the outflow when the bung-valves are open.

When the bung is to be employed in connection with an ale-barrel, and I desire to screen the fluid, I prefer to form, at the end of the bung, a threaded flange *w*, and in the same I screw a perforated disk *x*, which covers the openings through the valves, as will be understood.

In operating the device, the same being closed, I first insert the faucet and turn the same ninety degrees, more or less, which action throws the said faucet into impervious relation to the seat *s* and the valves to their opened positions. The fluid from the barrel is thus free to flow through openings in the valves to the opening *y* in the faucet. A reverse action closes said valves and brings the faucet to a position allowing a removal, all as will be understood.

Having thus described the invention, what I claim as new is—

1. In a faucet for casks, the combination of a bung having, near its inner end, a perforated valve-seat, and threads, *g*, forward of said seat, a hub having disks extending on opposite sides of the valve-seat and each of said disks having perforations coinciding with those in the valve-seat, and lying beyond the radial point of distance of the key end of the faucet from the axial center of the device, said disks both turning simultaneously with the hub to and from open relation with said seat, and allowing an outflow to the chamber outside of said key end, a faucet-seat forward of the outer valve-disk and at a distance therefrom, said chamber being formed between, and a faucet, having a key end engaging said hub, a side passage *y*, forward of said key end, and opening from the said chamber into the faucet, a seat or bearing *r*, to engage and form an impervious joint with the faucet, and means for forcing said faucet into impervious relation to the faucet-seat, all substantially as set forth.

2. In a faucet for casks, the combination of a bung having, near its rear end, a valve-seat and, forward of said seat, threads, *g*, and bearings, *h*, a hub, having a disk valve on the inner side of said valve-seat toward said threads and a head turning said disk valve to and from open relation, and an adjustable faucet-seat arranged on said screw-threads at a distance from said inner disk valve, a chamber being formed between, and a faucet having a key end, a lateral opening into said chamber, a flange adapted to bear imperviously upon said adjustable faucet-seat and a bearing to engage the bearing *h*, and force the faucet into impervious contact, substantially as set forth.

3. In a faucet for casks, the combination of a bung having a valve-seat near its inner end, faucet-retaining bearings near its outer end, and, at an intermediate point, a faucet-seat having a dished inner surface and, upon its outer surface, a projecting annular flange, the faucet-seat being so placed as to leave a chamber between it and the valve-seat with a disk valve engaging said valve-seat provided with a head in said chamber whereby it may be turned, and with a faucet constructed to engage said faucet-retaining bearings and having a key end to engage said head, lateral ports communicating with said chamber, and a face forward of said ports in which is an annular recess to engage the flange on the faucet-seat, substantially as set forth.

4. The combination in a faucet-bung, with the bung-body, having exterior threads, a seat for the faucet-key, means for holding said faucet-key on said seat, and at the rear or inner end of the interior, having a valve-seat *f*, extending inward from the walls of said body, and having passages for fluid therethrough, of valve-disks *i*, *j*, arranged on opposite sides of said seat, and connected together to turn simultaneously and together and the outside valve having its periphery extend out to the inner side walls of the bung and having passages corresponding with those in the seat, one of said disks having a forward key projection *l*, and a rearwardly-extending hub, which last is threaded and passes through the seat *f*, and a perforation in the other disk, and a nut holding said disks in engagement with said seat, substantially as set forth.

In testimony that I claim the foregoing I have hereunto set my hand this 11th day of January, 1896.

DILLON BEEBE.

Witnesses:
CHARLES H. PELL,
C. B. PITNEY.